(12) United States Patent
Huang

(10) Patent No.: US 10,368,361 B2
(45) Date of Patent: Jul. 30, 2019

(54) ADAPTIVE COMMUNICATION RESOURCE ALLOCATION IN A WIRELESS NETWORK

(71) Applicants: EMPIRE TECHNOLOGY DEVELOPMENT LLC, Wilmington, DE (US); Anpeng Huang, Beijing (CN)

(72) Inventor: Anpeng Huang, Beijing (CN)

(73) Assignee: Empire Technology Development LLC, Wilmington, DE (US)

( * ) Notice: Subject to any disclaimer, the term of this patent is extended or adjusted under 35 U.S.C. 154(b) by 178 days.

(21) Appl. No.: 15/500,928

(22) PCT Filed: Aug. 1, 2014

(86) PCT No.: PCT/CN2014/083578
§ 371 (c)(1),
(2) Date: Jan. 31, 2017

(87) PCT Pub. No.: WO2016/015345
PCT Pub. Date: Feb. 4, 2016

(65) Prior Publication Data
US 2017/0223719 A1   Aug. 3, 2017

(51) Int. Cl.
*H04W 72/08*   (2009.01)
*H04L 5/00*   (2006.01)
(Continued)

(52) U.S. Cl.
CPC ......... *H04W 72/085* (2013.01); *H04L 5/0057* (2013.01); *H04W 16/10* (2013.01);
(Continued)

(58) Field of Classification Search
CPC ........... H04W 72/0406; H04W 72/044; H04W 72/0493; H04W 72/06; H04W 72/08;
(Continued)

(56) References Cited

U.S. PATENT DOCUMENTS 7,782,821 B2 * 8/2010 Matsuo ................. H04L 5/0007
370/334
8,565,147 B2 * 10/2013 Komine ............... H04B 7/2621
370/320
(Continued)

FOREIGN PATENT DOCUMENTS

CN   101415275 B   5/2013
CN   103874221 A   6/2014
(Continued)

OTHER PUBLICATIONS

LTE-Advanced Physical Layer, Mathew Baker (Year: 2009).*
(Continued)

*Primary Examiner* — Brian T O Connor

(57) ABSTRACT

Frequency spectrum resources available to a node of a wireless communication network may be allocated for either an uplink or downlink channel by a scheduler module. The scheduler module may schedule a specific frequency spectrum resource based at least in part on whether the frequency spectrum resource has been assigned to a downlink resource pool, an uplink resource pool, or a shared resource pool. Assignment of frequency spectrum resources to the downlink resource pool, the uplink resource pool, or the shared resource pool may be based on suitability of each frequency spectrum resource for uplink channel or downlink channel.

17 Claims, 8 Drawing Sheets

(51) Int. Cl.
*H04W 16/14* (2009.01)
*H04W 72/04* (2009.01)
*H04W 72/12* (2009.01)
*H04W 16/10* (2009.01)
*H04W 88/08* (2009.01)

(52) U.S. Cl.
CPC ....... *H04W 16/14* (2013.01); *H04W 72/0453* (2013.01); *H04W 72/082* (2013.01); *H04W 72/1231* (2013.01); *H04W 88/08* (2013.01)

(58) Field of Classification Search
CPC ........... H04W 72/085; H04W 72/1231; H04W 72/0453; H04W 72/082; H04W 16/14; H04W 16/28; H04L 5/0057; H04L 5/0039; H04L 5/0041; H04L 5/0058; H04L 5/006; H04L 5/0076
USPC .......................................................... 370/329
See application file for complete search history.

(56) References Cited

U.S. PATENT DOCUMENTS

| | | | | |
|---|---|---|---|---|
| 8,937,895 B2* | 1/2015 | Xu | ........................ | H04L 5/001 370/311 |
| 9,571,244 B2* | 2/2017 | Takano | ................. | H04L 5/0035 |
| 10,057,901 B2* | 8/2018 | Zhang | ................... | H04W 72/04 |
| 10,172,119 B2* | 1/2019 | Lunttila | ................ | H04L 5/0007 |
| 2013/0308583 A1* | 11/2013 | Ogawa | ................... | H04L 5/0007 370/329 |
| 2014/0219210 A1* | 8/2014 | Lunttila | ................ | H04L 5/0007 370/329 |
| 2015/0009924 A1* | 1/2015 | Takano | ................. | H04L 5/0035 370/329 |
| 2015/0085808 A1* | 3/2015 | Xu | .......................... | H04L 5/001 370/329 |
| 2015/0365941 A1* | 12/2015 | Liu | ................... | H04W 72/0446 370/280 |

FOREIGN PATENT DOCUMENTS

| | | |
|---|---|---|
| EP | 3142434 A1 | 3/2017 |
| WO | 2007145557 A1 | 12/2007 |
| WO | 2010075638 A1 | 7/2010 |
| WO | 2013170426 A1 | 11/2013 |

OTHER PUBLICATIONS

Chen, L., et al., "Dynamic timeslot allocation algorithms suitable for asymetric traffic in multimedia TOMA/TDD cellular radio," 48th IEEE Vehicular Technology Conference, vol. 02, pp. 1424-1428 (May 18, 1998).

Extended European Search Report for European Patent Application No. EP14899031.0 dated Feb. 16, 2018, pp. 11.

Costa, E., et al., "Duplex arrangements for future broadband radio interfaces," D2.5 v1.1, in Information Society Technologies, pp. 121 (Oct. 30, 2004).

International Search Report and Written Opinion for International Application No. PCT/CN2014/083578 dated Apr. 24, 2015, pp. 8.

* cited by examiner

ADAPTIVE COMMUNICATION RESOURCE ALLOCATION IN A WIRELESS NETWORK

CROSS-REFERENCE TO RELATED APPLICATION

The present application is a U.S. National Stage filing under 35 U.S.C. § 371 of International Application No. PCT/CN2014/083578, filed on Aug. 1, 2014.

BACKGROUND

Unless otherwise indicated herein, the approaches described in this section are not prior art to the claims in this application and are not admitted to be prior art by inclusion in this section.

In recent years, wireless communication has become increasingly commonplace, with an accompanying improvement in the reliability of such service. However, with the development and ubiquitous use of mobile Internet devices, such as smart phones and the like, there has been explosive growth in the use of mobile Internet services, resulting in wireless traffic levels that may potentially exhaust available bandwidth. According to some forecasts of global mobile data traffic, smart phones represented only approximately 18 percent of total global handsets in use in 2012, but represented approximately 92 percent of total global handset traffic. With the total number of smart phones and other mobile Internet devices continuing to rise, global mobile data traffic in 2020 may be expected to reach approximately 500 to 1000 times that of such traffic in 2013. Consequently, any improvement in the efficient use of available wireless communication spectrum is a potential challenge to be addressed.

SUMMARY

In accordance with at least some embodiments of the present disclosure, a method for a base station of a wireless network to allocate communication resources between uplink and downlink channels comprises determining a quality status of a first frequency spectrum resource that is available for use by the base station for an uplink or downlink channel; assigning the first frequency spectrum resource to a shared resource pool based on the determined quality status of the first frequency spectrum resource; scheduling a second frequency spectrum resource that is available for use by the base station for the uplink or downlink channel based on an initial directional allocation of communication resources for the base station; after scheduling the second frequency spectrum resource for the base station, determining an updated directional allocation of communication resources for the base station; and selecting the first frequency spectrum resource from the shared resource pool and scheduling the first frequency spectrum resource for either the uplink channel or the downlink channel based on the determined updated directional allocation of communication resources for the base station.

In accordance with at least some embodiments of the present disclosure, a wireless base station for a wireless communication network comprises a quality status module, a processor module, a scheduler module, and a memory. The quality status module is configured to determine a quality status of a first frequency spectrum resource associated with an air interface that is available for use by the wireless base station for an uplink channel or a downlink channel, and to determine a quality status of a second frequency spectrum resource associated with the air interface that is available for use by the wireless base station for an uplink channel or downlink channel. The processor module is coupled to the quality status module and configured to assign the first frequency spectrum resource to a shared resource pool based on the determined quality status of the first frequency spectrum resource. The scheduler module is coupled to the processor module and configured to schedule the second frequency spectrum resource for an uplink channel or downlink channel based on an initial directional allocation of frequency spectrum resources for the wireless base station and to schedule the first frequency spectrum resource based on an updated directional allocation of frequency spectrum resources for the wireless base station.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope. The disclosure will be described with additional specificity and detail through use of the accompanying drawings.

DETAILED DESCRIPTION

Figure 1:
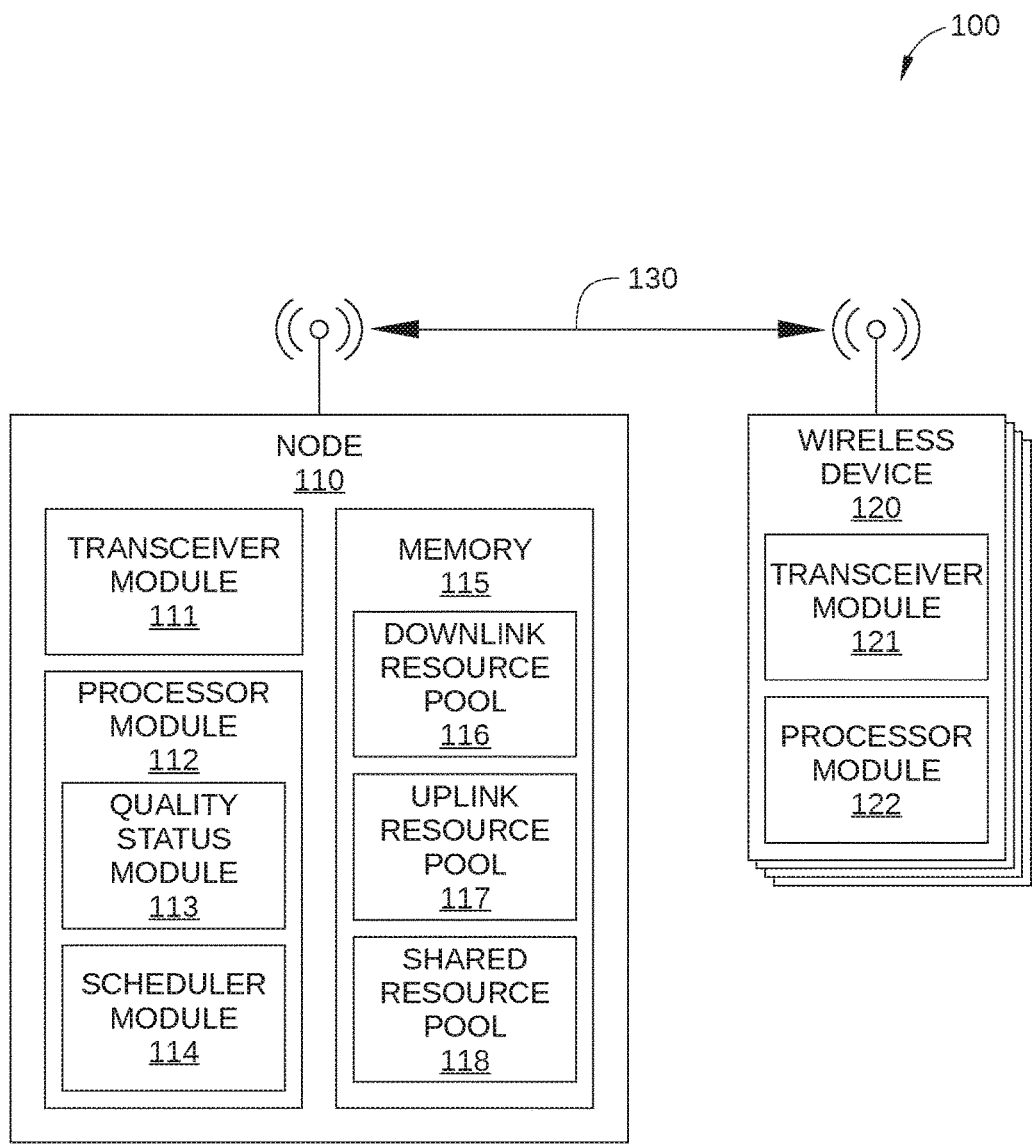
FIG. 1 illustrates a wireless mobile network, according to one or more embodiments of the disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the disclosure, as generally described herein, and illustrated in the Figures, can be arranged, substituted, combined, and designed in a wide variety of different configurations, all of which are explicitly contemplated and made part of this disclosure.

This disclosure is generally drawn, inter alia, to methods, apparatus, systems, devices, and computer program products related to allocating communication resources in a wireless network between uplink and downlink channels.

As described above, demand for the limited spectrum available for wireless communication may be high and increasing quickly as mobile Internet use becomes part of daily life for more and more consumers. In addition, the wireless traffic currently being carried by wireless communication networks may be both "bursty" and asymmetric. Bursty traffic may be characterized by unpredictable and sudden increases and decreases in volume. For example, in modern wireless communication networks, a particular cell base station may have widely variable and somewhat random peak hours. This may be due, for example, to approximately 1% of users typically generating more than about 60% of daily network traffic, and less than approximately 10% of users generating about 90% of daily network traffic. Asymmetric traffic may be characterized by a large disparity between total volume associated with uplink channels and downlink channels at a particular time. For example, more than approximately 75% of daily network load may be typically associated with downlink traffic.

Such bursty and asymmetric wireless traffic can significantly undermine the ability of a node (such as a cell base station) of a wireless mobile network to efficiently utilize available frequency spectrum resources. This may be because duplex communication schemes commonly used in wireless mobile networks, such as time-division duplex (TDD) and frequency-division duplex (FDD) systems, may typically be unable to employ all available frequency spectrum resources when uplink and downlink traffic is constantly changing. Because the transmission signal strength at a node may be orders of magnitude greater than the reception signal strength, a transceiver for the node may typically be constrained to receive or transmit in a particular frequency band rather than transmitting and receiving in the band simultaneously. Consequently, uplink channels (for receiving data) and downlink channels (for transmitting data) of the node may be separated in the frequency and/or the time domain. This static or semi-static allocation of uplink and downlink channels can result in unused or underutilized frequency spectrum resources when uplink and downlink traffic loads change between the node and the mobile stations (e.g., mobile phones or mobile computers using a mobile broadband adapter) serviced by the node. According to some embodiments, a wireless network may be configured to reduce or substantially eliminate unused or underutilized frequency spectrum resources. One such wireless network is illustrated in FIG. 1.

FIG. 1 illustrates a wireless mobile network 100, according to one or more embodiments of the disclosure. Wireless mobile network 100 may include at least one node 110 and at least one wireless device 120, and may include other components (which are not illustrated herein for purposes of brevity and clarity). Node 110 may be embodied as a cell base station, a base transceiver station (BTS), an evolved node B (eNodeB), or other device that is communicatively coupled to or included in wireless mobile network 100 and is configured to communicate with wireless device 120. Wireless device 120, also referred to as a mobile station (MS) or as user equipment (UE), may be embodied as a mobile handset, a laptop computer equipped with a mobile broadband adapter, or any other device suitably configured to connect to or otherwise communicate with node 110.

Node 110 may include a transceiver module 111, a processor module 112, and a memory 115. Transceiver module 111 may be configured to communicate with one or more wireless devices 120 via an air interface 130 using uplink and downlink channels, the allocation of which is described below in conjunction with FIG. 2C. For example, transceiver module 111 may include a transmitter to transmit data to one or more wireless devices 120 via downlink channels established by node 110 and a receiver to receive data from one or more wireless devices 120 via uplink channels established by node 110. Memory 115 may include a downlink resource pool 116, an uplink resource pool 117, and a shared resource pool 118, each of which is described in greater detail below in conjunction with FIG. 2C.

Processor module 112 may be configured to control and/or perform the operations of node 110. In some embodiments, processor module 112 may include a quality status module 113 configured to determine a quality status of frequency spectrum resources associated with air interface 130 that are available for use by node 110 for an uplink or downlink channel, where air interface 130 may include the radio-based communication link between wireless device 120 and node 110. In such embodiments, quality status module 113 may determine the quality status of each frequency spectrum resources associated with air interface 130 based on channel quality indicator (CQI), received interference power (RIP), and/or any other suitable quality metric or key performance indicator, such as RSSI, acknowledgement/negative acknowledgement (ACK/NACK) frequency, dropping rate, block error rate, bit error rate, signal-to-interference-plus-noise ratio (SINR), etc. In some embodiments, processor module 112 may include a scheduler module 114 configured to schedule frequency spectrum resources associated with air interface 130 based on a target directional allocation of radio resources (e.g., frequency spectrum resources) for node 110. The target directional allocation of such resources may be based at least in part on current resource requests from node 110 (e.g., processor module 111) and from the one or more wireless devices 120 serviced by node 110. Thus, when resource requests for downlink traffic from node 110 are greater than resource requests for uplink traffic from the one or more wireless devices 120 serviced by node 110, scheduler module 114 may allocate frequency spectrum resources between uplink and downlink channels accordingly. According to some embodiments, the allocation of each specific frequency spectrum resource available to node 110 as either an uplink and downlink channel by scheduler module 114 (i.e., directional allocation of communication resources for the base station) may be based at least in part on whether the specific frequency spectrum resource has been assigned to downlink resource pool 116, uplink resource pool 117, or shared resource pool 118. Such embodiments are described below in conjunction with FIGS. 2C and 4. The various elements of node 110 may be operatively coupled to each other, and may comprise components of hardware, software (or other computer-readable instruction stored on a non-transitory computer-readable medium and executable by one or more processors), or a combination of hardware and software (including firmware).

Wireless device 120 may include a transceiver module 121 and a processor module 122 operatively coupled to each other. Transceiver module 121 may include hardware, software, and/or firmware components or combinations thereof suitable for communicating with node 110 via uplink and downlink channels established by node 110. Processor module 122 may include software and/or firmware components or combinations thereof that enable wireless device 120 to provide information to node 110 for determining CQI, RIP, and/or any other suitable quality metric of frequency spectrum resources associated with air interface 130.

Figure 2A:
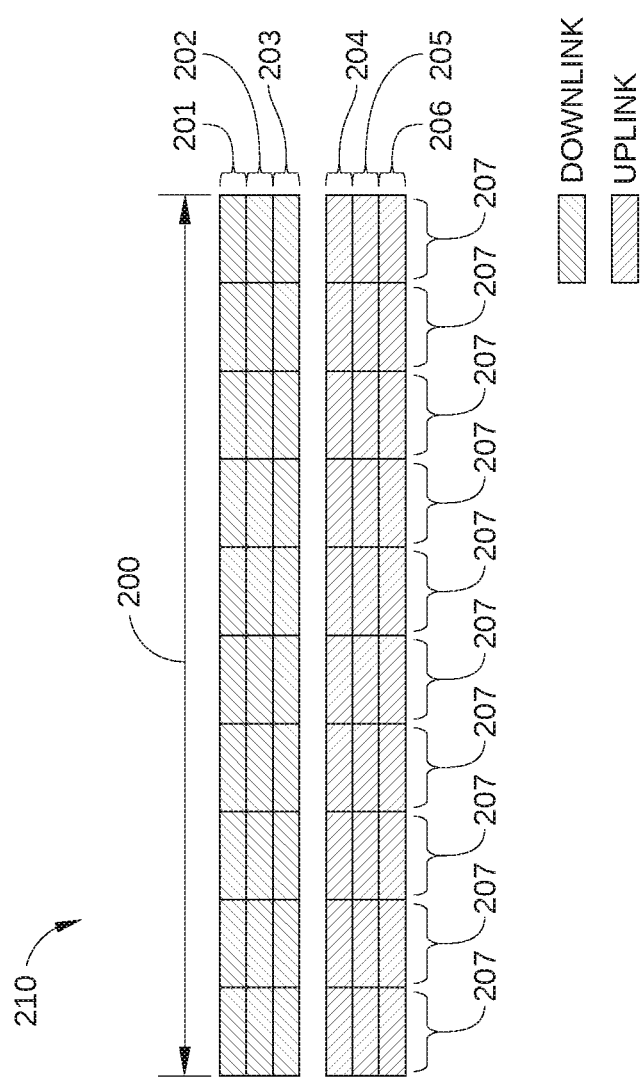
FIG. 2A illustrates an example of a frequency-division duplex allocation scheme applied to a radio frame and a plurality of frequency spectrum resources.
Figure 2B:
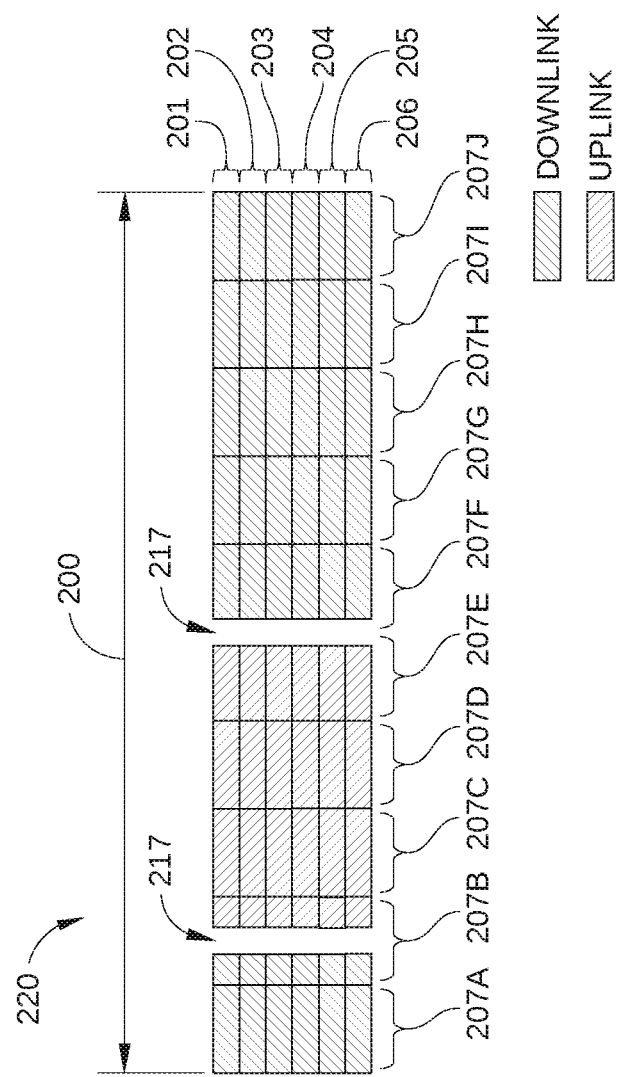
FIG. 2B illustrates an example of a time-division duplex allocation scheme applied to a radio frame and multiple subcarriers.
Figure 2C:
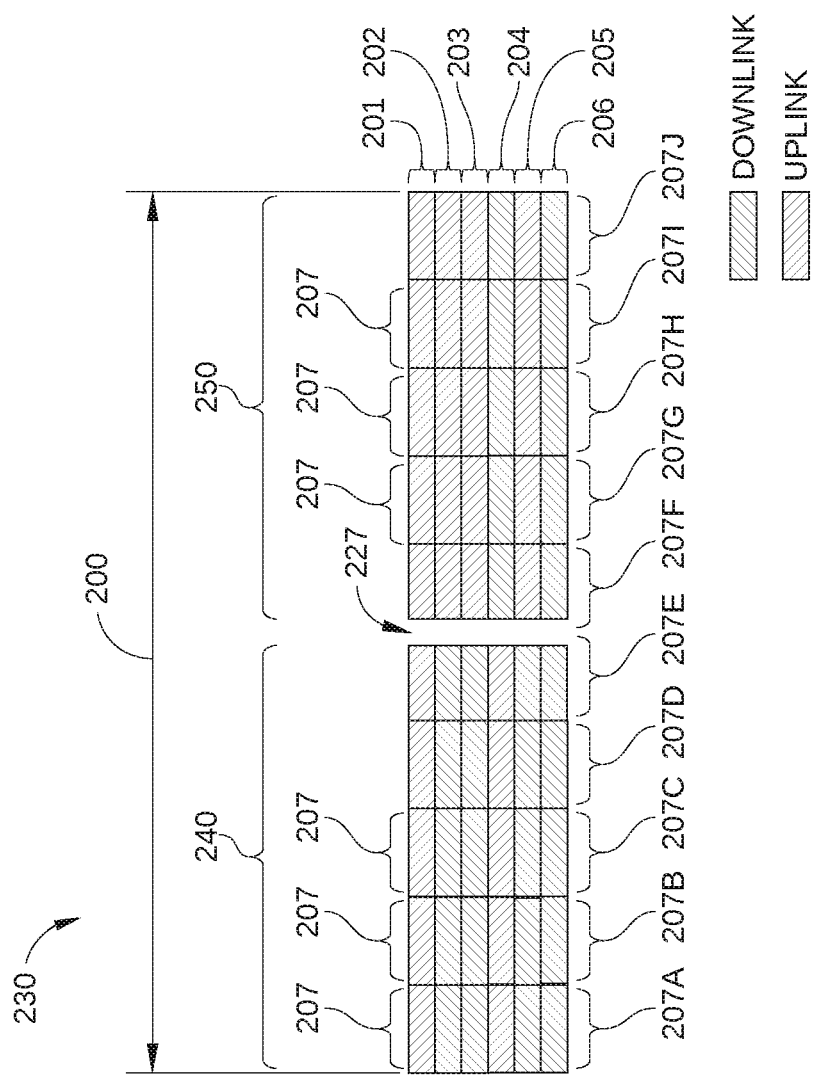
FIG. 2C illustrates an example of an adaptive radio resource allocation scheme applied to a radio frame and multiple subcarriers, according to at least some embodiments of the present disclosure.

FIGS. 2A-2C illustrate examples of the allocation of frequency spectrum resources for nodes of a wireless mobile network, according to various duplex communication schemes. Specifically, FIG. 2A illustrates frequency spectrum resource allocation employing FDD; FIG. 2B illustrates frequency spectrum resource allocation employing TDD; and FIG. 2C illustrates adaptive frequency spectrum resource allocation in wireless mobile network 100 according to at least some embodiments of the present disclosure.

FIG. 2A illustrates an example of an FDD allocation scheme 210 applied to a radio frame 200 and a plurality of frequency spectrum resources, subcarriers 201-206. Radio frame 200 may be one of a plurality of recurrent data blocks that are associated with a node of a wireless mobile network, where each radio frame 200 corresponds to a time slot of fixed length, for example 10 ms. Radio frame 200 may include a fixed number (for instance, ten) of subframes 207. Each of subframes 207 may occupy a time slot and may be, for example, 1 ms second in duration. Each of subcarriers 201-206 may be a frequency spectrum resource that may be available for use by the node as either an uplink channel or a downlink channel, such as a unique frequency band. Together, radio frame 200 and subcarriers 201-206 may make up an air interface for the portion of the wireless mobile network associated with the node. It is noted that such air interface may include fewer than six subcarriers 201-206 or many more than six subcarriers 201-206, For example, in long term evolution (LTE) networks, a minimum of 72 subcarriers may be employed at a particular node or base station.

In FDD allocation scheme 210, the transmitter and the receiver of the node may operate at different carrier frequencies. Stated in another way, the transmitter may use some of subcarriers 201-206 as downlink channels, and the receiver may use other of subcarriers 201-206 as uplink channels. Furthermore, in FDD allocation scheme 210, downlink and uplink channels may usually be operated in paired spectra, in which the same amount of radio resources are reserved for downlink channels and for uplink channels. In the example illustrated in FIG. 2A, the node may employ subcarriers 201-203 for uplink channels and subcarriers 204-206 for downlink channels. Generally, FDD allocation scheme 210 may be more suited to applications like voice calls, whose bidirectional capacity requirements are equal, but is less suitable for Internet applications due to the asymmetric and bursty traffic characterized thereby. To wit, even when downlink traffic from the node to wireless devices greatly exceeds uplink traffic from the wireless devices to the node, in FDD allocation scheme 210, the number of subcarriers 201-206 allocated as uplink channels (e.g., subcarriers 201-203) may remain equal to the number of subcarriers 201-206 that are allocated as downlink channels (e.g., subcarriers 204-206). Therefore, some or most of subcarriers 201-203 may be idle or underutilized at the same time that subcarriers 204-206 cannot satisfy all downlink requests.

FIG. 2B illustrates an example of a TDD allocation scheme 220 applied to radio frame 200 and subcarriers 201-206. TDD allocation scheme 220 may be based upon using the same frequency spectrum resources (subcarriers 201-206) for both uplink and downlink transmission, where wireless devices and a node do not transmit concurrently. Thus, any one of subcarriers 201-206 may be used for an uplink channel and for a downlink channel during radio frame 200, albeit during different subframes 207. As shown in FIG. 2B, each of subcarriers 201-206 may be used for a downlink channel during subframes 207A and subframes 207F-207J, and for an uplink channel during subframes 207C-207E. When the proportion of uplink and downlink traffic changes, the number of subframes 207 during which subcarriers 201-206 are used for uplink channels and the number of subframes 207 during which subcarriers 201-206 are used for downlink channels can be reconfigured accordingly.

TDD allocation scheme 220 may be useful for applications with traffic asymmetry, such as when downlink traffic far exceeds uplink traffic (or vice-versa) during a particular radio frame. However, TDD allocation scheme 220 may also have drawbacks. First, there may generally be a limited number of different configurations available, typically seven, for the allocation of subcarriers 201-206 as uplink and downlink channels. So while the proportion of uplink channel capacity and downlink channel capacity for the node can be varied, the granularity of options may be limited. Therefore, some of subcarriers 201-206 may usually be underutilized in each radio frame 200, since the proportion of uplink channel capacity and downlink channel capacity for the node may not be closely matched to the current requirements of the node and the wireless devices.

Second, in TDD allocation scheme 220 each radio frame 200 may generally include at least one guard period 217, which may expend frequency spectrum resources (subcarriers 201-206) that could otherwise be employed as uplink or downlink channels. Guard period 217, also sometimes referred to as a "guard interval," may be used to ensure that distinct transmissions do not interfere with one another. For example, guard period 217 may prevent downlink transmissions carried by subcarrier 201 in an earlier portion of subframe 207B from interfering with uplink transmissions carried by subcarrier 201 in a later portion of subframe 207B. Thus, during guard period 217, data may generally not be interpreted by the node or the wireless devices. Guard period 217 may be a period of time that could be typically longer than the delay spread associated with uplink and downlink channels available to the node. To avoid data loss and to reduce interference caused by propagation delay between each user timeslot (a contiguous series of subframes used by either the node or the wireless device) and a following user timeslot, one or more guard periods 217 may be used in each radio frame 200. Typically, each user timeslot may end with such a guard period.

Third, TDD allocation scheme 220 may rely on discontinuous transmission of uplink and downlink traffic to separate uplink and downlink transmission, for example using the above-described guard periods 217. Discontinuous transmission could degrade performance of radio frequency (RF) power amplifiers in transmitters.

Fourth, implementation of TDD allocation scheme 220 may involve extra signaling overhead. Specifically, for each of the different configurations available for the allocation of subcarriers 201-206 as uplink and downlink channels with respect to subframes 107, configuration information may be transmitted to and/or from the wireless devices and the node. Such additional signaling overhead may expend frequency spectrum resources (subcarriers 201-206) that could otherwise be employed as uplink or downlink channels.

FIG. 2C illustrates an example of an adaptive radio resource allocation scheme 230 applied to radio frame 200 and subcarriers 201-206, according to at least some embodiments of the present disclosure, TDD allocation scheme 220 may include dynamic allocation of subcarriers 201-206 in both the time and frequency domains. Consequently, the number of subcarriers 201-206 allocated to uplink channels and to downlink channels can be finely tailored to match the time-varying bandwidth demand associated with the expanded use of mobile Internet services. Thus, even when the proportion of uplink traffic to downlink traffic changes rapidly, subcarriers 201-206 can be effectively exploited, so that none or very few of subcarriers 201-206 are unused or underutilized.

As shown in FIG. 2C, some of subcarriers 201-206 may be allocated by scheduler module 114 of node 110 for uplink channels for the duration of radio frame 200 (except during guard period 227), while other of subcarriers 201-206 may be allocated by scheduler module 114 for downlink channels for the duration of radio frame 200, In addition, still other of subcarriers 201-206 may be allocated by scheduler module 114 for uplink channels in some subframes 207 of radio frame 200 and allocated by scheduler module 114 for downlink channels in other subframes 207 of radio frame 200. For example, in the scenario depicted in FIG. 2C, subcarrier 201 may be allocated for an uplink channel for the duration of radio frame 200 while subcarrier 206 may be allocated as a downlink channel for the duration of radio frame 200. Concurrently, subcarriers 202, 203, and 205 may be allocated as downlink channels during a first portion 240 of radio frame 200 (subframes 207A-207D and a portion of subframe 207E) and as uplink channels during a second portion 250 of radio frame 200 (a portion of subframe 207E and subframes 207F-207J). Conversely, subcarrier 204 may be allocated for an uplink channel during first portion 240 of radio frame 200 and as a downlink channel during second portion 250 of radio frame 200.

In some embodiments, in adaptive radio resource allocation scheme 230, radio frame 200 may include guard period 227 when subcarriers 201-206 are reconfigured to have a different direction allocation. As is the case with guard period 217 in FIG. 2B, during guard period 227, data may generally not be interpreted by node 110 or wireless devices 120. Thus, guard period 227 may be used to ensure that a transmission associated with a specific frequency spectrum resource, such as a downlink transmission, does not interfere with a transmission that is subsequently associated with the specific frequency spectrum resource, such as an uplink transmission. Guard period 227 may be a period of time that is typically longer than the delay spread associated with uplink and downlink channels available to node 110, for example on the order of about 1 microsecond. As shown in FIG. 2C, guard period 227 may be disposed between first portion 240 of radio frame 200 and second portion 250 of radio frame 200, where the direction allocation of subcarriers 201-206 may be constant in first portion 240 and the direction allocation of subcarriers 201-206 may be constant in second portion 250. Thus, guard period 227 may prevent downlink transmissions carried by subcarriers 202, 203, 205, and 206 in first portion 240 of radio frame 200 from interfering with uplink transmissions carried by, respectively, subcarriers 202, 203, 205, and 206 in second portion 250 of radio frame 200. Similarly, guard period 227 may prevent uplink transmissions carried by subcarriers 201 and 204 in first portion 240 of radio frame 200 from interfering with transmissions carried by, respectively, subcarriers 201 and 204 in second portion 250 of radio frame 200.

While guard period 227 may be in some ways similar to guard period 217 in FIG. 2B, guard period 227 may be fundamentally different from guard period 217 in at least one aspect. Specifically, in adaptive radio resource allocation scheme 230, guard period 227 may be included in a particular radio frame 200 when one "homogeneous frame" ends and another homogeneous frame begins in the particular radio frame 200. A homogeneous frame may be considered to be any consecutive series of subframes 207 in which the direction allocation of subcarriers 201-206 remains unchanged. Thus, first portion 240 of radio frame 200 may be considered as some or all of one homogeneous frame in adaptive radio resource allocation scheme 230, and second portion 250 of radio frame 200 may be considered as some or all of another homogeneous frame. Because guard period 227 may be disposed between different homogeneous frames, and because a homogeneous frame typically may have a duration that includes multiple radio frames 200, in some embodiments, guard periods 227 may occur substantially less frequently than once per radio frame 200. One such embodiment is illustrated in FIG. 3.

Figure 3:
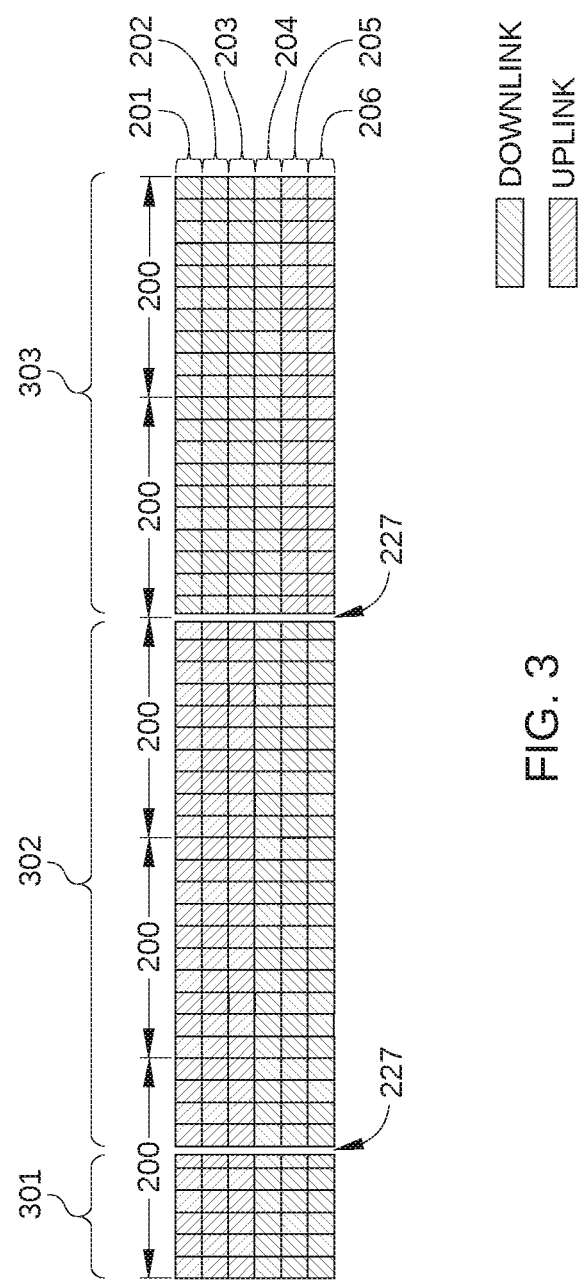
FIG. 3 illustrates example multiple consecutive homogeneous frames, configured according to at least some embodiments of the disclosure.

FIG. 3 illustrates example multiple consecutive homogeneous frames 301, 302, and 303, configured according to at least some embodiments of the disclosure. Each of homogeneous frames 301, 302, and 303 may include multiple subframes 207, and in some cases multiple radio frames 200. As shown, homogeneous frame 301 may precede homogeneous frame 302 and may be separated from homogeneous frame 302 by a guard period 227 (described above in conjunction with FIG. 2C). Similarly, homogeneous frame 302 may precede homogeneous frame 303 and may be separated from homogeneous frame 303 by a guard period 227. It is noted that homogeneous frames 302 and 303 each may include multiple radio frames 200, since in each case, the direction allocation of subcarriers 201-206 may remain unchanged for a period of time longer than a single radio frame 200. Consequently, the total duration of time in which frequency spectrum resources are idle during guard periods 227 in adaptive radio resource allocation scheme 230 may generally be significantly less than the total duration of time in which frequency spectrum resources are idle during guard period 217 in TDD allocation scheme 220.

In operation, node 110 in FIG. 1 may implement adaptive radio resource allocation scheme 230 according to the following procedure. In some embodiments, the following procedure may be performed once per radio frame 200. In other embodiments, the procedure may be performed more frequently (for example, once every few subframes 207) or less frequently (for example, once every N radio frames, once every second, etc.).

First, node 110 may obtain the quality status of the current uplink and downlink frequency spectrum resources available (e.g., subcarriers 201-206) using quality status module 113. For example, quality status module 113 may acquire suitability of some or all of subcarriers 201-206 for uplink channels by measurement of RIP for each of subcarriers 201-206. To acquire suitability of some or all of subcarriers 201-206 for downlink channels, node 110 may measure CQI, for example through the measurement of reference signal received power (RSRP) and received signal strength indicator (RSSI). The measurement of RIP and CQI can be based on the particle size of a wavelet or on a smaller particle size, such as physical resource block (PRB), a plurality of which may typically be included in each subframe 207. It is noted that determination of quality status, as described above, can be performed using information typically already measured by LTE and LTE-Advanced wireless communication systems. Consequently, no additional signaling or other procedures may be needed for implementation of the herein-described procedure.

Second, node 110 may sort the available frequency spectrum resources based on the quality status measured for each. Thus, processor module 112 may assign high-quality resources to downlink resource pool 116 and/or to uplink resource pool 117, and may assign lower-quality frequency spectrum resources to shared resource pool 118. For example, in some embodiments, subcarriers with high CQI, which may indicate that the subcarrier is well-suited for a downlink channel, may be assigned to downlink resource pool 116, and subcarriers with low RIP, which may indicate that the subcarrier is well-suited for an uplink channel, may be assigned to uplink resource pool 117. In such embodiments, the assigned subcarriers may be ranked in order of suitability, so that during scheduling (described below), the subcarriers assigned to downlink resource pool 116 that are most suitable for uplink channels can be selected first for downlink channels and the subcarriers assigned to uplink resource pool 117 that are most suitable for uplink channels can be selected first for uplink channels. Similarly, in some embodiments, the subcarriers that are assigned to shared resource pool 118 may be ranked in terms suitability for uplink and for downlink channels, for example based on RIP and CQI values, respectively. Furthermore, in some embodiments, one or more frequency spectrum resources may be assigned to both downlink resource pool 116 and uplink resource pool 117, such as when a particular subcarrier has both high CQI and low RIP.

Third, scheduler module 114 may schedule some or all of the frequency spectrum resources assigned to downlink resource pool 116 for downlink channels for node 110 and some or all of the frequency spectrum resources assigned to uplink resource pool 117 for uplink channels for node 110. In some embodiments, scheduler module 114 may perform such scheduling based on an initial directional allocation of frequency spectrum resources for node 110, where the initial directional allocation of communication resources may indicate current resource requests from wireless devices 120 and from node 110. In this way, the number of frequency spectrum resources scheduled for downlink channels may not exceed the current number of requested downlink channels requested by wireless devices 120, and the number of frequency spectrum resources scheduled for uplink channels may not exceed the current number of requested uplink channels requested by node 110.

Fourth, processor module 112 may determine an updated directional allocation of frequency spectrum resources for node 110. In some embodiments, the updated directional allocation of frequency spectrum resources may be based on the number of current resource requests from wireless devices 120, on the number of current resource requests from node 110, on the number of frequency spectrum resources scheduled from uplink resource pool 117 for uplink channels, on the number of frequency spectrum resources scheduled from downlink resource pool 116 for downlink channels, and/or on some other factor(s) or combination(s) thereof. Thus, in such embodiments, the updated directional allocation of frequency spectrum resources may be based on the remaining resource requests (for both uplink and downlink channels) that are not yet satisfied after scheduling frequency spectrum resources assigned to downlink resource pool 116 and to uplink resource pool 117.

Fifth, when there are remaining resource requests for node 110 (for either uplink or downlink channels) that are not yet satisfied, scheduler module 114 may schedule one or more frequency spectrum resources assigned to shared resource pool 118 for uplink and/or downlink channels. In some embodiments, the scheduling of such frequency spectrum resources may be based on the updated directional allocation of frequency spectrum resources described above. Consequently, frequency spectrum resources may be dynamically allocated to satisfy resource requests for node 110, so that very few or no frequency spectrum resources are idle.

Furthermore, in some embodiments, a particular frequency spectrum resource assigned to shared resource pool 118 may be scheduled by scheduler module 114 of node 110 for an uplink or a downlink channel based on suitability of the particular frequency spectrum resource for an uplink or a downlink channel, respectively. For example, a frequency spectrum resource assigned to shared resource pool 118 may be scheduled by scheduler module 114 of node 110 for a downlink channel when the frequency spectrum resource has a higher CQI than other frequency spectrum resources assigned to shared resource pool 118. Similarly, a frequency spectrum resource assigned to shared resource pool 118 may be scheduled by scheduler module 114 of node 110 for an uplink channel when the frequency spectrum resource has a lower RIP than other frequency spectrum resources assigned to shared resource pool 118. Thus, not only are available frequency spectrum resources efficiently utilized by node 110, these frequency spectrum resources may be scheduled for either uplink or downlink channel based on the current suitability of each resource, which can enhance user experience and system-level performance.

While assignment and scheduling of frequency spectrum resources is described herein in terms of subcarriers 201-206, the above-described procedure may also be implemented on an individual PRB basis. Thus, each individual PRB (a plurality of which may be associated with each frequency spectrum resource in a single subframe 207) may be assigned to one or more of downlink resource pool 116, uplink resource pool 117, and/or shared resource pool 118, and may be scheduled for an uplink channel or a downlink channel.

Figure 4:
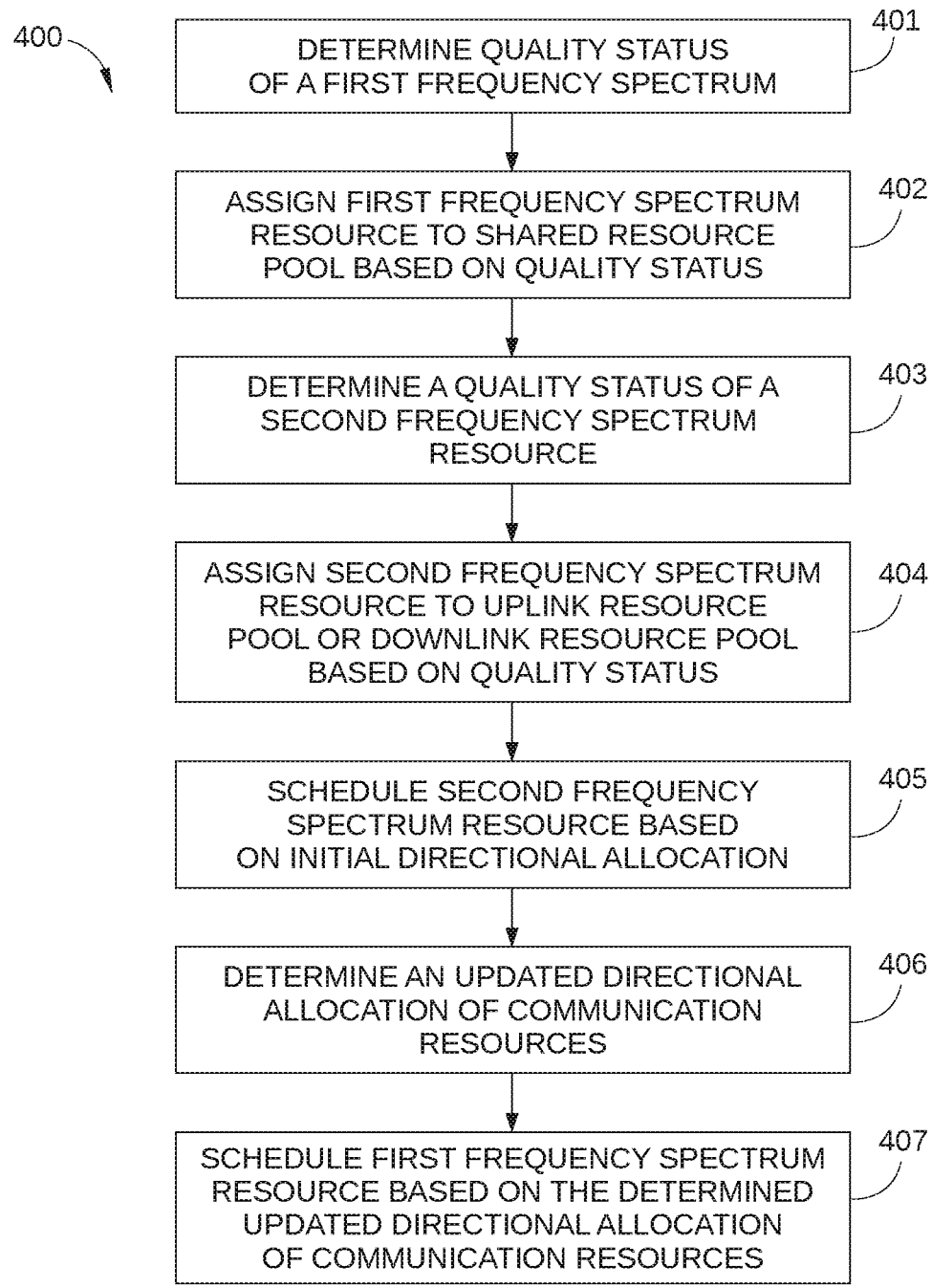
FIG. 4 sets forth a flowchart of an example method for a base station of a wireless network to allocate communication resources between uplink and downlink channels, according to an embodiment of the disclosure.

FIG. 4 sets forth a flowchart of an example method 400 for a base station of a wireless network to allocate communication resources between uplink and downlink channels, according to an embodiment of the disclosure. Method 400 may include one or more operations, functions, or actions as illustrated by one or more of blocks 401-405. Although the blocks are illustrated in a sequential order, these blocks may also be performed in parallel, and/or in a different order than those described herein. Also, the various blocks may be combined into fewer blocks, divided into additional blocks, and/or eliminated based upon the particular implementation. Additional blocks representing other operations, functions, or actions may be provided. Although method 400 is described in conjunction with node 110 of FIG. 1, any suitable computing device configured to perform method 400 is within the scope of this disclosure.

Method 400 may begin in block 401 ("Determine quality status of a first frequency spectrum"), in which quality status module 113 (or any other suitably configured software, firmware, or logic circuit entity, etc.) may determine a quality status of at least a first frequency spectrum resource that is available for use by the base station for an uplink or downlink channel, such as one of subcarriers 201-206. In some embodiments, quality status module 113 may determine this quality status by determining at least one of a channel quality indicator (CQI) value and a received interference power (RIP) of the first frequency spectrum resource. CQI and RIP are each existing channel performance measures that may already typically be in place in wireless networks. Hence, no additional signaling may be required for quality status module 113 to complete block 401.

In block 402 ("Assign first frequency spectrum resource to shared resource pool based on quality status"), processor module 112 (or any other suitably configured software, firmware, or logic circuit entity, etc.) may assign the first frequency spectrum resource to shared resource pool 118, based on the quality status of the first frequency spectrum resource determined in block 401. In some embodiments, processor module 112 may assign the first frequency spectrum resource to shared resource pool 118 when it is determined that the first frequency spectrum resource is less suitable for an uplink channel than one or more other frequency spectrum resources available to node 110 and also is less suitable for a downlink channel than one or more frequency spectrum resource that are available to node 110.

Specifically, the first frequency spectrum resource may be determined by quality status module 113 to be less suitable for a downlink channel in response to a CQI of the first frequency spectrum resource being less than a CQI of one or more other frequency spectrum resources. Similarly, the first frequency spectrum resource may be determined by quality status module 113 to be less suitable for an uplink channel than one or more other frequency spectrum resources in response to an RIP of the first frequency spectrum resource being greater than an RIP of the one or more other frequency spectrum resources. Thus, because the first frequency spectrum resource is determined by quality status module 113 to currently be a sub-optimal resource for uplink and/or downlink channels, the first frequency spectrum resource may be assigned by processor module 112 to shared resource pool 118. The first frequency spectrum resource may subsequently be scheduled by scheduler module 114 (see block 407) for an uplink or a downlink channel after higher quality frequency spectrum resources are scheduled for use, and if additional radio resources may be needed to satisfy current resource requests by node 110 and/or wireless devices 120.

In block 403 ("Determine a quality status of a second frequency spectrum resource"), quality status module 113 may determine a quality status of at least a second frequency spectrum resource that is available for use by the base station for an uplink or downlink channel, such as one of subcarriers 201-206. Quality status of the second frequency spectrum resource may be determined using techniques described above in block 401.

In block 404, ("Assign second frequency spectrum resource to uplink resource pool or downlink resource pool based on quality status"), processor module 112 (or any other suitably configured software, firmware, or logic circuit entity, etc.) may assign the second frequency spectrum resource to downlink resource pool 116 and/or to uplink resource pool 117 based on the quality status determined in block 403. For example, in response to the quality status of the second frequency spectrum resource being indicative that the second frequency spectrum is usable for an uplink channel, processor module 112 may assign the second frequency spectrum resource to uplink resource pool 117. In some embodiments, the second frequency spectrum resource may be "usable for an uplink channel" when the quality status meets or exceeds a particular threshold, such as when an RIP value associated with the second frequency spectrum resource is equal to or less than a specified maximum value or some other value. Similarly, in response to the quality status of the second frequency spectrum resource being indicative that the second frequency spectrum usable for a downlink channel, processor module 112 may assign the second frequency spectrum resource to downlink resource pool 116. In some embodiments, the second frequency spectrum resource may be "usable for a downlink channel" when the quality status meets or exceeds a particular threshold, such as when a CQI value associated with the second frequency spectrum resource is equal to or greater than a specified minimum value or some other value.

In block 405, ("Schedule second frequency spectrum resource based on initial directional allocation"), scheduler module 114 (or any other suitably configured software, firmware, or logic circuit entity, etc.) may schedule the second frequency spectrum resource for an uplink or a downlink channel based on an initial directional allocation of communication resources for node 110. The initial direction allocation of communication resources may indicate a target number of uplink and downlink channels node 110 should establish to satisfy current uplink and downlink traffic of node 110. For example, an initial direction allocation of communication resources may be based on current resource requests from wireless devices 120 and from node 110. Thus, when the second frequency spectrum resource is determined to be suitable for an uplink channel, and the initial direction allocation of communication resources indicates that node 110 should establish an uplink channel to satisfy current uplink and downlink traffic of node 110, scheduler module 114 may schedule the second frequency spectrum resource for an uplink channel. Similarly, when the second frequency spectrum resource is determined to be suitable for a downlink channel, and the initial direction allocation of communication resources indicates that node 110 should establish a downlink channel to satisfy current uplink and downlink traffic of node 110, scheduler module 114 may schedule the second frequency spectrum resource for a downlink channel.

In block 406 ("Determine an updated directional allocation of communication resources"), after scheduling the second frequency spectrum resource in block 403, processor module 112 (or any other suitably configured software, firmware, or logic circuit entity, etc.) may determine an updated directional allocation of communication resources for node 110. Specifically, the updated directional allocation of frequency spectrum resources may be based on current resource requests from wireless devices 120, on current resource requests from node 110, on the number of frequency spectrum resources that are already assigned for uplink channels, on the number of frequency spectrum resources assigned for downlink channels, and/or on other factor(s) or combination(s) thereof. Thus, the updated direction allocation of frequency spectrum resources may indicate, after the second frequency spectrum resource is assigned for one of an uplink or downlink channel, whether any additional uplink or downlink channels should be established by node 110 to satisfy current resource requests from wireless devices 120 and node 110.

In block 407 ("Schedule first frequency spectrum resource based on the determined updated directional allocation of communication resources"), scheduler module 114 (or any other suitably configured software, firmware, or logic circuit entity, etc.) may select the first frequency spectrum resource from shared resource pool 118 and may schedule the first spectrum for either an uplink channel or a downlink channel. Scheduler module 114 may schedule the first frequency spectrum resource for either uplink channel or downlink channel based on the updated directional allocation of communication resources determined in block 406. Thus, frequency spectrum resources previously assigned to shared resource pool 118 in block 402 may be scheduled according to what resources node 110 are usable to satisfy current resource requests from wireless devices 120 and node 110 after higher-quality frequency spectrum resources have been scheduled.

Figure 5:
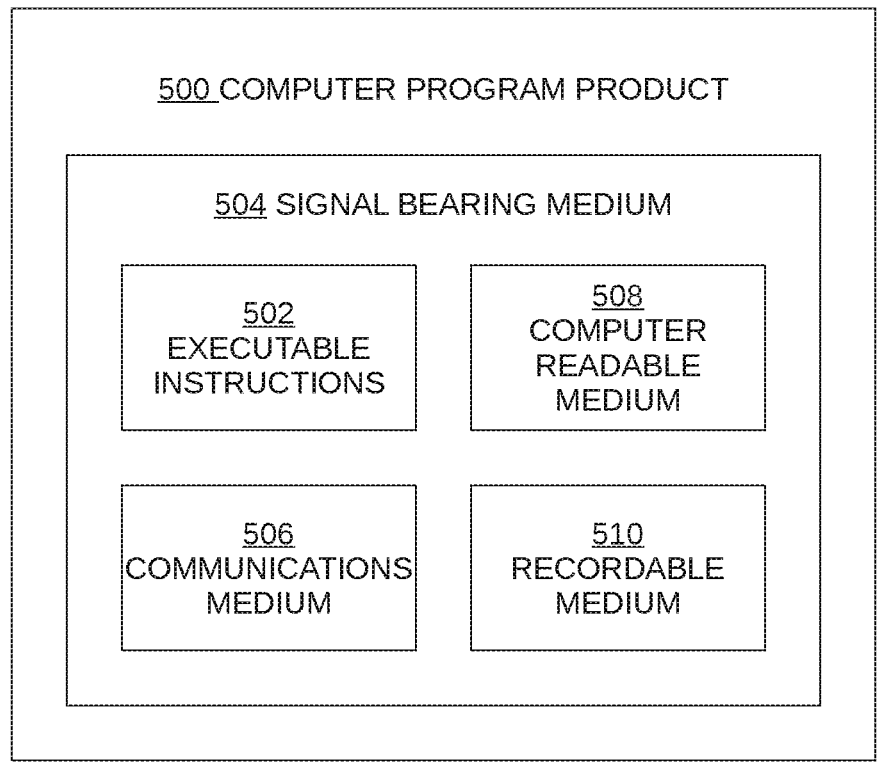
FIG. 5 is a block diagram of an illustrative embodiment of a computer program product to implement a method for dynamic resource allocation in a wireless network.

FIG. 5 is a block diagram of an illustrative embodiment of a computer program product 500 to implement a method for dynamic resource allocation in a wireless network. Computer program product 500 may include a signal bearing medium 504. Signal bearing medium 504 may include one or more sets of executable instructions 502 that, in response to execution by, for example, a processor of a computing device, may provide at least the functionality or features described above with respect to FIGS. 1-4.

In some implementations, signal bearing medium 504 may encompass a non-transitory computer readable medium 508, such as, but not limited to, a hard disk drive, a compact disc (CD), a digital video disk (DVD), a digital tape, memory, etc. In some implementations, signal bearing medium 504 may encompass a recordable medium 510, such as, but not limited to, memory, read/write (RAN) CDs, RAN DVDs, etc. In some implementations, signal bearing medium 504 may encompass a communications medium 506, such as, but not limited to, a digital and/or an analog communication medium (e.g., a fiber optic cable, a waveguide, a wired communications link, a wireless communication link, etc.). Computer program product 500 may be recorded on non-transitory computer readable medium 508 or another similar recordable medium 510.

Figure 6:
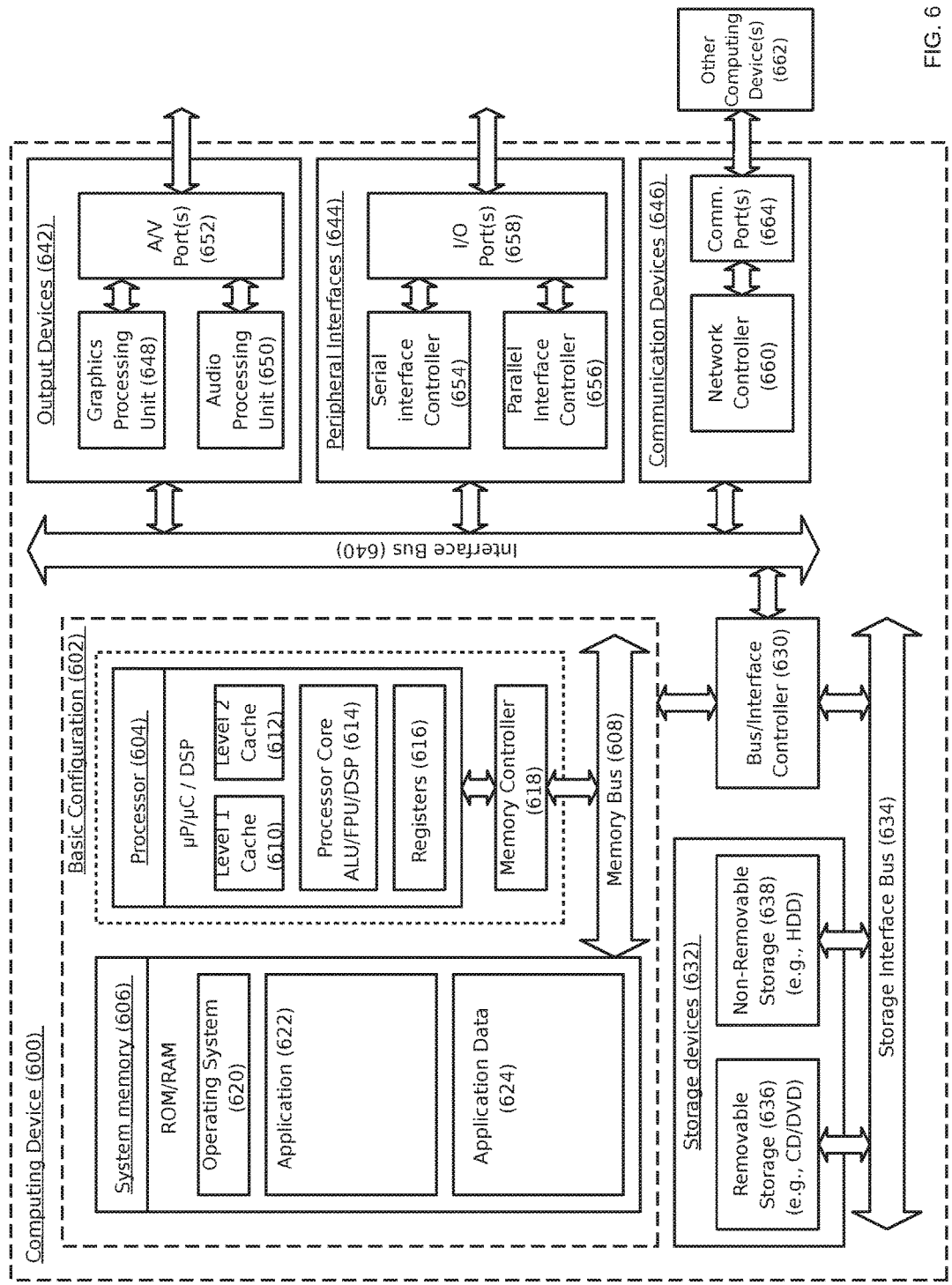
FIG. 6 is a block diagram illustrating an example computing device, according to at least some embodiments of the present disclosure.

FIG. 6 is a block diagram illustrating an example computing device 600, according to at least some embodiments of the present disclosure. In some embodiments, computing device 600 may be used to implement node 110 of FIG. 1. In a very basic configuration 602, computing device 600 typically includes one or more chip multiprocessors 604 and a system memory 606. A memory bus 608 may be used for communicating between processor 604 and system memory 606.

Chip multiprocessor 604 may be substantially similar in configuration and operation to processor module 112 in FIG. 1. Depending on the desired configuration, processor 604 may be of any type including but not limited to a microprocessor (µP), a microcontroller (µC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 (which may be used to implement main memory 170 of FIG. 1) may be of any type including but not limited to volatile memory (such as RAM), non-volatile memory (such as ROM, flash memory, etc.) or any combination thereof. System memory 606 may include an operating system 620, one or more applications 622, and program data 624. Application 622 may be arranged to perform at least the functions and operations as those described with respect processor module 112. Application data 624 may be useful for operation with application 622. In some embodiments, application 622 may be arranged to operate with application data 624 on operating system 620. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more AN ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link, such as, without limitation, optical fiber, Long Term Evolution (LTE), 3G, WiMax, via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via application specific integrated circuits (ASICs), field programmable gate arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and designing the circuitry and/or writing the code for the software and or firmware are possible in light of this disclosure. In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a compact disc (CD), a digital video disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. A typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. Such depicted architectures are merely exemplary, and in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments are possible. The various aspects and embodiments disclosed herein are for purposes of illustration and are not intended to be limiting, with the true scope and spirit being indicated by the following claims.

I claim:

1. A method for a base station of a wireless network to allocate communication resources between uplink and downlink channels, the method comprising:
   determining a quality status of a first frequency spectrum resource that is available for use by the base station for an uplink channel or a downlink channel;
   determining, based on the quality status, that the first frequency spectrum resource is a sub-optimal resource, for the uplink channel and the downlink channel, relative to other frequency spectrum resources that are available for use by the base station;
   in response to determining that the first frequency spectrum resource is the sub-optimal resource, assigning the first frequency spectrum resource to a shared resource pool;
   scheduling, based on an initial directional allocation of communication resources for the base station, a second frequency spectrum resource that is available for use by the base station for the uplink channel or the downlink channel;
   after scheduling the second frequency spectrum resource for the base station, determining an updated directional allocation of communication resources for the base station; and
   selecting the first frequency spectrum resource from the shared resource pool, and scheduling the first frequency spectrum resource for either the uplink channel or the downlink channel based on the determined updated directional allocation of communication resources for the base station,
   wherein determining that the first frequency spectrum resource is the sub-optimal resource comprises determining that the first frequency spectrum resource is:
      less suitable for the uplink channel than a third frequency spectrum resource that is available for use by the base station, and
      less suitable for the downlink channel than a fourth frequency spectrum resource that is available for use by the base station.

2. The method of claim 1, wherein determining that the first frequency spectrum resource is less suitable for the downlink channel than the fourth frequency spectrum resource comprises determining that a channel quality indicator (CQI) of the first frequency spectrum resource is less than a CQI of the fourth frequency spectrum resource.

3. The method of claim 1, wherein determining that the first frequency spectrum resource is less suitable for the uplink channel than the third frequency spectrum resource comprises determining that a received interference power (RIP) of the first frequency spectrum resource is greater than an RIP of the third frequency spectrum resource.

4. The method of claim 1, further comprising:
   determining a quality status of the second frequency spectrum resource; and
   based on the determined quality status of the second frequency spectrum resource, assigning the second frequency spectrum resource to one of an uplink resource pool or a downlink resource pool.

5. The method of claim 4, wherein assigning the second frequency spectrum resource to one of the uplink resource pool or the downlink resource pool comprises:
   assigning the second frequency spectrum resource to the uplink resource pool in response to the quality status of the second frequency spectrum resource being indicative of the second frequency spectrum being usable for the uplink channel, or
   assigning the second frequency spectrum resource to the downlink resource pool in response to the quality status of the second frequency spectrum resource being indicative of the second frequency spectrum being usable for the downlink channel.

6. The method of claim 4, wherein determining the quality status of the second frequency spectrum resource comprises determining at least one of a channel quality indicator (CQI) and a received interference power (RIP) of the second frequency spectrum resource.

7. The method of claim 4, wherein assigning the second frequency spectrum resource to one of the uplink resource pool or the downlink resource pool comprises ranking, based on the quality status of the second frequency spectrum resource, the second frequency spectrum resource with respect to other frequency spectrum resources assigned to the uplink resource pool or the downlink resource pool.

8. The method of claim 1, wherein determining the quality status of the first frequency spectrum resource comprises determining at least one of a channel quality indicator (CQI) and a received interference power (RIP) of the first frequency spectrum resource.

9. The method of claim 1, wherein assigning the first frequency spectrum resource to the shared resource pool comprises assigning a physical resource block that includes multiple subcarriers and multiple resource elements associated with each of the multiple subcarriers to the shared resource pool.

10. A wireless base station for a wireless communication network, the wireless base station comprising:
   a quality status module configured to determine a respective quality status of a first frequency spectrum resource and a second frequency spectrum resource, wherein each of the first frequency spectrum resource and the second frequency spectrum resource are associated with an air interface that is available for use by the wireless base station for an uplink channel or a downlink channel;
   a processor coupled to the quality status module and configured to:
      determine, based on the quality status of the first frequency spectrum resource, that the first frequency spectrum resource is a sub-optimal resource, for the uplink channel and the downlink channel, relative to other frequency spectrum resources that are available for use by the wireless base station; and in response to the determination that the first frequency spectrum resource is the sub-optimal resource, assign the first frequency spectrum resource to a shared resource pool; and a scheduler module coupled to the processor and configured to:

schedule the second frequency spectrum resource for the uplink channel or the downlink channel based on an initial directional allocation of frequency spectrum resources for the wireless base station;

determine an updated directional allocation of frequency spectrum resources for the wireless base station after the second frequency spectrum resource is scheduled for the uplink channel or the downlink channel; and schedule the first frequency spectrum resource based on the updated directional allocation of frequency spectrum resources for the wireless base station.

11. The wireless base station of claim 10, further comprising:

a memory coupled to the processor and configured to store an uplink resource pool, a downlink resource pool, and the shared resource pool, wherein the processor is further configured to assign, based on the determined quality status of the second frequency spectrum resource, the second frequency spectrum resource to one of the uplink resource pool or the downlink resource pool.

12. The wireless base station of claim 10, wherein the updated directional allocation of frequency spectrum resources is based on one or more of: current resource requests from a wireless device serviced by the wireless base station, current resource requests from the wireless base station, a number of frequency spectrum resources scheduled from an uplink resource pool for uplink channels, and a number of frequency spectrum resources scheduled from a downlink resource pool for downlink channels.

13. The wireless base station of claim 10, wherein the initial directional allocation of frequency spectrum resources is based on current resource requests from a wireless device serviced by the wireless base station, and current resource requests from the wireless base station.

14. The wireless base station of claim 10, wherein the quality status module is configured to determine the quality status of the first frequency spectrum resource by determination of at least one of a channel quality indicator (CQI) and a received interference power (RIP) of the first frequency spectrum resource.

15. The wireless base station of claim 10, wherein the first frequency spectrum resource includes multiple subcarriers and multiple resource elements associated with each of the multiple subcarriers.

16. The wireless base station of claim 10, wherein to determine that the first frequency spectrum resource is the sub-optimal resource, the processor is configured to:

determine that the first frequency spectrum resource is less suitable for the uplink channel than a third frequency spectrum resource that is available for use by the wireless base station; and determine that the first frequency spectrum resource is less suitable for the downlink channel than a fourth frequency spectrum resource that is available for use by the wireless base station.

17. A non-transitory computer-readable medium that includes computer-executable instructions stored thereon, which in response to execution by a processor, cause the processor to perform or control performance of operations that comprise:

determine a quality status of a first frequency spectrum resource that is available for use by a base station for an uplink channel or a downlink channel;

determine, based on the quality status, that the first frequency spectrum resource is a sub-optimal resource, for the uplink channel and the downlink channel, relative to other frequency spectrum resources that are available for use by the base station, wherein to determine that the first frequency spectrum resource is the sub-optimal resource, the computer-executable instructions, in response to execution by the processor, cause the processor to perform or control performance of at least one operation that comprises:

determine that a channel quality indicator (CQI) of the first frequency spectrum resource is less than a respective CQI of one or more other frequency spectrum resources that are available for use by the base station; and determine that a received interference power (RIP) of the first frequency spectrum resources is greater than a respective RIP of the one or more other frequency spectrum resources that are available for use by the base station;

in response to the determination that the first frequency spectrum resource is the sub-optimal resource, assign the first frequency spectrum resource to a shared resource pool;

schedule, based on an initial directional allocation of communication resources for the base station, a second frequency spectrum resource that is available for use by the base station for the uplink channel or the downlink channel;

after the second frequency spectrum resource is scheduled for use by the base station, determine an updated directional allocation of communication resources for the base station; and select the first frequency spectrum resource from the shared resource pool, and schedule the first frequency spectrum resource for either the uplink channel or the downlink channel based on the determined updated directional allocation of communication resources for the base station.

* * * * *